UNITED STATES PATENT OFFICE.

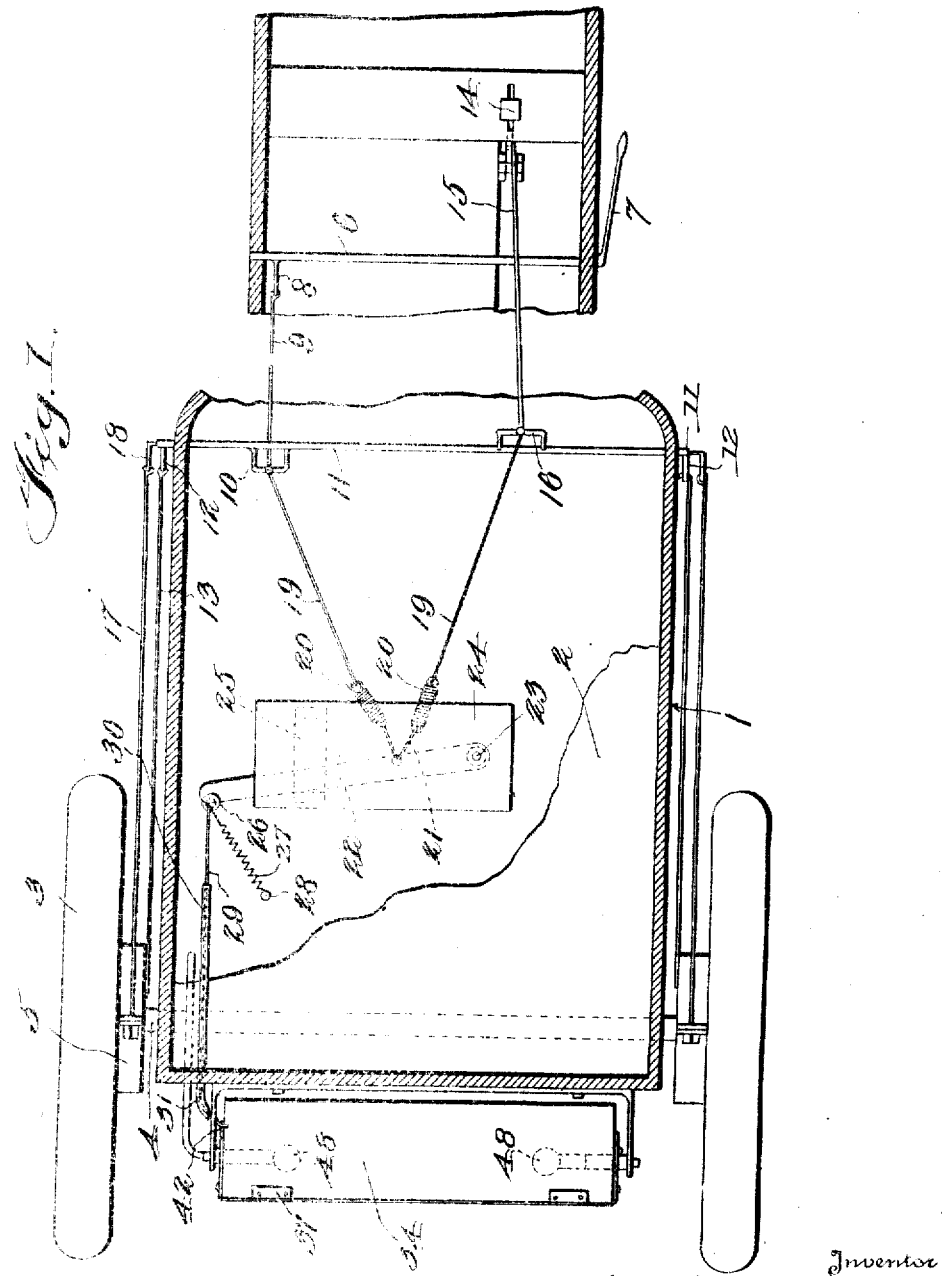

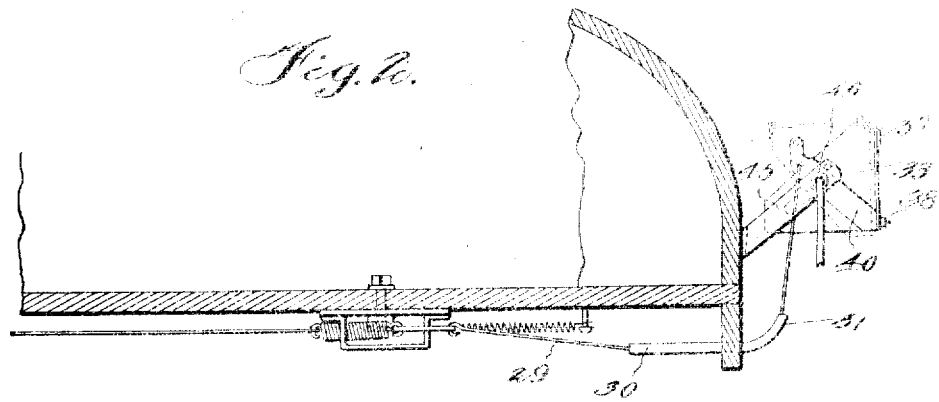
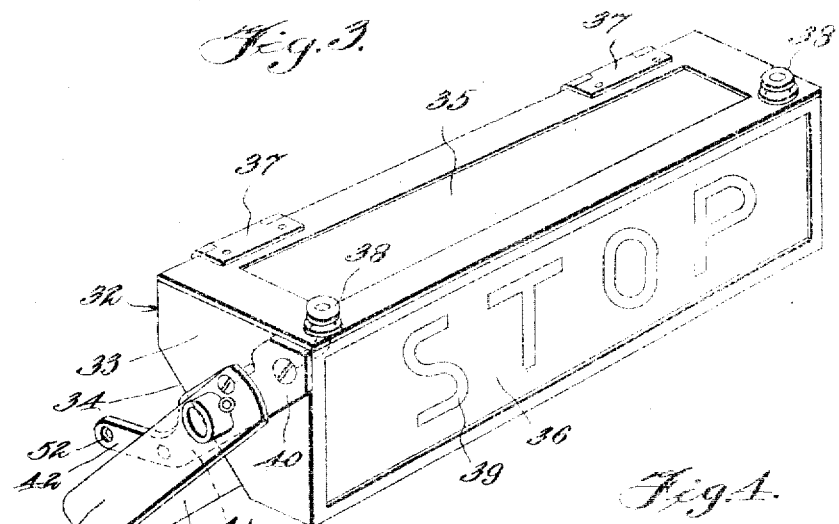
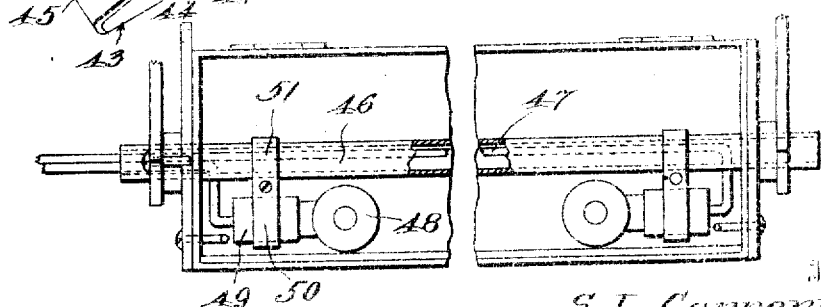

STEPHEN L. CARPENTER, OF NEW ROCHELLE, NEW YORK, ASSIGNOR OF ONE-HALF TO LEOPOLD KARPEN, OF NEW ROCHELLE, NEW YORK.

AUTOMOBILE-SIGNAL.

1,240,024.  Specification of Letters Patent.  Patented Sept. 11, 1917.

Application filed April 19, 1915. Serial No. 22,467.

*To all whom it may concern:*

Be it known that I, STEPHEN L. CARPENTER, a citizen of the United States, residing at New Rochelle, in the county of Westchester and State of New York, have invented certain new and useful Improvements in Automobile-Signals; and I do hereby declare the following to be a full, clear, and exact description of the invention, such as will enable other skilled in the art to which it appertains to make and use the same.

This invention relates to new and useful improvements in automobile signals and the principal object of the invention is to provide a device by which a driver may signal a vehicle which might be following his intentioned stop.

Another object of the invention is to provide a signal of the above character which is automatically operated upon the application of either the service or emergency brake.

A further object of the invention is to provide a device which is readily attachable to motor vehicles of the usual construction without necessitating the modification thereof in any measurable degree.

Still another object of the invention is to provide a novel form of signal and supporting bracket therefor.

With the above and other objects in view, the invention consists in the novel combination and arrangement of parts which will be fully set forth in the following specification and accompanying drawings, in which:—

Figure 1 is a fragmentary plan view of a vehicle body showing my improved signal applied thereto.

Fig. 2 is a vertical sectional view of a fragment of the body showing the signal in place.

Fig. 3 is a detail perspective view of the signal, and

Fig. 4 is a horizontal sectional view of the signal.

Referring now to the drawing by characters of reference, the numeral 1 designates as an entirety the vehicle body provided with the usual flooring 2. The usual supporting frame is provided and carries the wheels 3 on the axle 4 and these wheels are provided with the ordinary type of brake drums 5. Journaled transversely of the frame is the usual emergency brake shaft 6 carrying the emergency brake levers 7 and to this shaft is connected the arm 8 to which is connected the brake rod 9, the rear end of which is connected to a U-shaped bracket 10 formed on the brake controlling shaft 11', the opposite ends of which are provided with arms 12 to which the brake rods 13 are connected which operate on the interior of the brake drum 5.

The service brake pedal 14 is pivoted in the usual way and has connected thereto the operating rod 15, the opposite end of which is pivoted to the U-shaped frame 16 on the shaft 11 and it will be seen that when the service brake pedal 14 is operated, power will be transmitted to the shaft 11 and it will pull on the connecting rods 17 which are secured to the rod 18 formed at each end of the shaft 11'. The opposite end of each rod 17 is connected in any suitable manner with the exterior brake operating mechanism of the brake drum 5. It will thus be seen that when the service brake is operated, the shaft 11 will be rotated and when the emergency brake lever 7 is operated, the shaft 11' will be rotated. Connected to the U-shaped frames 16 and 10 are bars 19, the opposite ends of which are connected to springs 20. These springs 20 are connected by means of the links 21 to the lever 22 which is pivoted as at 23 to a plate 24 carried on the under side of the floor 2 of the vehicle. This plate is provided with a suitable guide 25 for the free end of the lever to work within. A ring 26 is connected to the free end of the lever and has secured thereto a spring 27, which is attached in any suitable manner to the floor as at 28.

A suitable flexible connection 29 is provided and operates through the tube 30 which extends beneath the foot-board and is slightly upturned as at 31 so that the end of the flexible member opposite the one which is connected to the lever 22 is directed upwardly.

Having described the vehicle and operating mechanism for the signal it now remains to proceed with the detail description of the signal which comprises the casing designated generally by the numeral 32. This casing comprises the substantially rectangular housing 33, one corner of which is bevelled as at 34. Two adjacent walls of the housing are formed of transparent panels 35 and 36 and the transparent panel 35 is hinged as at 37 to the housing to enable the user to gain access to the interior of the housing to make repairs and the like. Suitable fastenings 38 are carried by the housing and are arranged to engage the panel 35 to hold the same closed when in normal position. The panel 35 is preferably formed of green glass while the panel 36 is preferably of red glass and provided with the transparent letters forming the word "stop." The ends of the housing are provided with diagonally extending bracing strips 40 and one of these strips is extended as at 41 and provided with the angular extensions 42 which form a lever, the use of which will appear as the description proceeds. Each of these strips is provided with a suitable opening for the reception of the bearing shaft on which the signal is pivoted.

In order to support the signal, the brackets designated generally by the numeral 43 are provided and comprise the strip 44, the ends of which are bent upwardly and angularly as at 45, thus forming a centrally U-shaped frame. The free ends of the bent portions 45 are provided with openings for the reception of the tubular shaft 46 on which the signal is mounted and this shaft 46 is preferably tubular in form to accommodate the wires 47 which supply electric current to the lamp 48 so that the device may be illuminated at night. These lamps 48 are supported in suitable lamp brackets 49 which are held between the clamped ends 50 of the clamps 51 which surround the shaft 46 and support the lamps after being positioned. The end of the flexible member 29 opposite the one which is secured to the lever 22 is secured in any suitable manner through one of the openings 52 formed in the extensions 41 and 42. It will thus be seen that when the lever is operated, the housing 32 will be thrown into position shown in Fig. 4.

It will be apparent from the foregoing that in use as soon as either the emergency brake or service brake is operated, pull will be exerted on one of the connecting rods 19 and thereby move the lever 22 so that its free end will exert pull on the flexible member 29 and thereby move the signal into the position shown in Fig. 4 indicating that the driver has applied the brake. The application of the brake is not limited as the spring 20 will give after the lever has moved its limit, so that the brakes may be applied as hard as necessary without injuring the signaling mechanism. As soon as the pressure is released from the brake pedal or lever it is evident that the spring 27 will return the lever to its normal position and thereby permit the housing to drop by gravity into the position shown in Fig. 2, thereby showing green and indicating the driver's intention to proceed. It is also evident that the necessity of the driver giving any thought to the operation of the signal is eliminated as the device is operated entirely automatically upon the application of either of the brakes.

While in the foregoing there has been shown and described the preferred embodiment of this invention, it is to be understood that such changes may be made in the combination and arrangement of parts as will fall within the spirit and scope of the appended claim.

What I claim is:—

A direction indicator comprising an elongated casing, a glass plate closing one of the walls of the casing and having direction indicating characters thereon, a colored glass plate closing another wall of the casing for forming a tail light signal, braces secured to the end walls and extending diagonally thereof, a hollow shaft extending through the casing and the braces, a substantially U-shaped supporting member having its arm portions adjacent their free ends apertured to rotatably receive the ends of the hollow shaft, a curved extension formed upon one of the braces and adapted to have means connected thereto for rotating the casing within the substantially U-shaped supporting member to bring the direction indicating character into view, said hollow shaft having apertures therein and located within the casing, electric wires extending into the hollow shaft and through the apertures thereof, brackets secured to the hollow shaft adjacent each end, electric lamp sockets carried by said brackets and connected with the wires extending outwardly through the apertures of the shaft, and electric lamps carried by said sockets for illuminating the casing.

In testimony whereof I affix my signature in presence of two witnesses.

STEPHEN L. CARPENTER.

Witnesses:
HARRY L. COHEN,
JOHN J. AERMOR.